INVENTORS
William R. Jewett
Charles M. Krzyzkowski

BY

H. L. Gammons
AGENT

United States Patent Office 3,557,620
Patented Jan. 26, 1971

3,557,620
FLUID PRESSURE MEASURING MEANS
William R. Jewett, Westfield, and Charles M. Krzyzkowski, Parlin, N.J., assignors to National Lead Company, New York, N.Y., a corporation of New Jersey
Filed Mar. 20, 1969, Ser. No. 808,908
Int. Cl. G07l 7/00
U.S. Cl. 73—388
3 Claims

ABSTRACT OF THE DISCLOSURE

A pressure measuring apparatus adapted to measure the pressure of a solids-burdened fluid in a chamber and having an aperture in the wall of the chamber sealed normally with a self-sealing apertured diaphragm adapted to be penetrated temporarily by a hollow needle-like pressure testing probe. The latter is connected to a pressurized vessel having a pressure gage and a valve and pressurized to well above the probable pressure in the chamber. The valve is arranged to release the pressure in the pressurized vessel until the pressures in the vessel and in the chamber respectively are equalized whereby the pressure gage measures the pressure in the chamber.

BACKGROUND OF THE INVENTION

The use of conventional gauges for measuring fluid pressure (or vacuum) in a chamber or conduit containing a fluid in which finely divided solid particles are suspended, as for example $TiO_2$ pigment particles, is consistantly attended by plugging or fouling the pressure gauge or otherwise rendering it in accurate or useless. Recent efforts to solve this problem are illustrated in U.S. Pat. No. 3,163,529, Jewett, filed Apr. 29, 1960 which discloses fluid pressure measuring means characterized by a pneumatic sleeve forming a section of a pipeline carrying a solids burdened fluid, the pneumatic sleeve being responsive to a change of pressure in the pipe line which pressure change is read from a pressure gauge connected to the pneumatic sleeve but isolated thereby from the solids-burdened fluid in the conduit. While this pressure measuring device is quite successful it does require breaking a pipe line to install the pressure measuring unit. This is a relatively expensive operation and may not always be convenient. Moreover, the pneumatic sleeve is not readily adapted for use with pressure vessels, tanks, chambers, and the like.

SUMMARY OF THE INVENTION

The present invention relates to a relatively simple and convenient means for measuring the pressure of a solids-burdened fluid in a vessel, tank or conduit, hereinafter referred to generically as a chamber, by the relatively simple expedient of providing a hole in the chamber at any selected point therein, which hole is normally sealed by an apertured self-sealing diaphragm, and measuring the pressure in the chamber by inserting into the self-sealing diaphragm a hollow needle-like probe connected to a pressure vessel pressurized to a pressure well above the probable pressure in the chamber, opening a valve between the hollow needle-like probe and the pressurized vessel to release the pressure in the latter until its pressure is balanced by the pressure of the fluid in the chamber and reading this pressure from a pressure gauge of the pressurized vessel.

Thus despite the fact that the pressure gauge is in communication with the solids-burdened fluid in the chamber the pressure in the pressure vessel is always either greater than or equal to the pressure of the solids-burdened fluid in the chamber and hence the solids are precluded from reaching and plugging the gauge. Further while the invention contemplates pressure measuring means in the form of fixed or permanent equipment a preferred construction is one wherein the pressure vessel and its attached pressure testing probe are portable as a consequence of which tests may be quickly and easily made at any point in a chamber where an apertured self-sealing diaphragm is located.

DESCRIPTION OF PREFERRED EMBODIMENT

Figure 1:
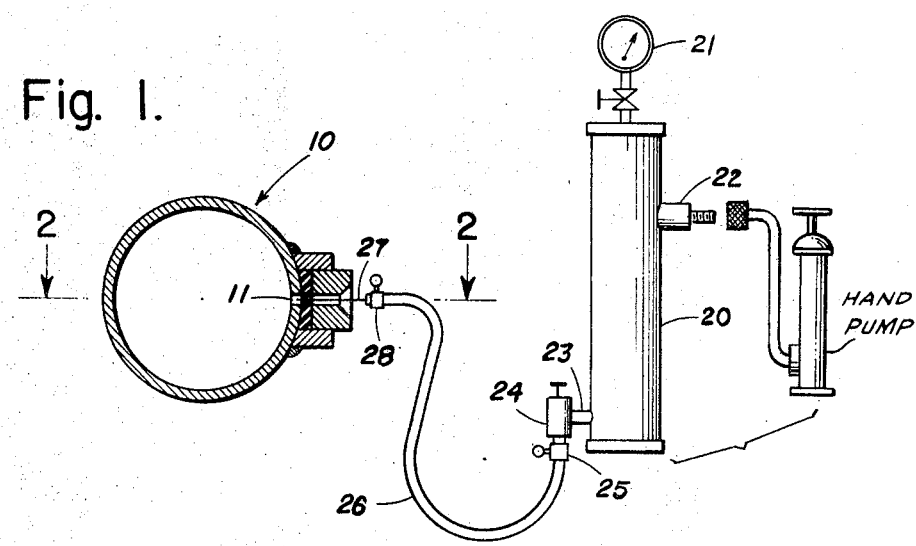
FIG. 1 shows a chamber in cross section having an apertured self-sealing diaphragm assembly secured over an aperture in the wall thereof with the pressure testing probe of a pressure vessel inserted in the diaphragm.
Figure 3:
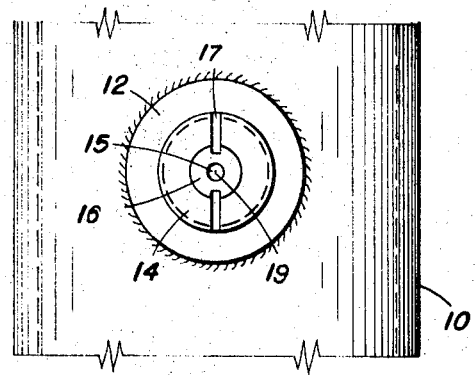
FIG. 3 is a fragmentary plan view of the chamber and apertured self-sealing diaphragm assembly in the direction of arrows 3—3 of FIG. 2.
Figure 2:
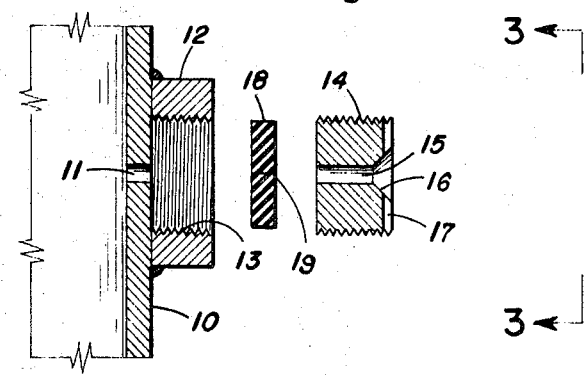
FIG. 2 is an enlarged, fragmentary, exploded, plan view in cross section, of the chamber in the direction of arrows 2—2 of FIG. 1 showing details of the apertured self-sealing diaphragm assembly.

The preferred embodiment of the invention is shown in FIGS. 1–3 of the drawings in which the chamber containing the pressurized solids-burdened fluid comprises a conduit indicated by numeral 10. An aperture 11 is drilled or otherwise formed on the wall of the conduit. The manner in which the hole 11 is made is not critical but nevertheless it is important that it be in axial alignment with a pilot aperture, hereinbefore described, to facilitate insertion of a pressure testing probe into the hole 11 of the conduit. To this end good mechanical engineering practice dictates that prior to drilling the hole 11 a metal ring-member 12 having a central, internally threaded aperture 13 be welded or otherwise secured to the exterior wall of the conduit 10 substantially concentric with the spot where the hole 11 is to be drilled; and that an externally threaded metal plug 14 dimensioned to make a screw threaded fit in the central aperture 13 of the metal ring 12 be threaded therein. The metal plug 14 is provided with an axial, smooth bored pilot aperture 15 provided with a countersink 16 in the exterior face of the plug 14 and a diametrical kerf 17 the latter being adapted to accommodate a screw driver or equivalent tool for threading the plug 14 into the ring 12. The smooth bored pilot aperture 15 of the plug 14 has a diameter equal to that of the hole 11 to be drilled in the conduit 10 and serves to guide or pilot a drill of the same diameter into contact with the wall of the conduit whereby the hole 11 drilled in the wall thereof is in exact alignment with the pilot aperture 15 of the plug 14.

In addition to serving as pilot for drilling the hole 11 in the conduit 10 the ring and plug constitute members of an apertured self-sealing diaphragm assembly for temporarily sealing the hole 11 in the conduit. Referring especially to FIGS. 2 and 3—having drilled the hole in the conduit in the manner hereinabove described the apertured pilot plug 14 is backed out of the ring 12 and a centrally apertured disc-shaped self-sealing diaphragm 18 is introduced into the metal ring 12 after which the apertured pilot plug is screwed back into the ring to hold the self-sealing diaphragm with a fluid tight seal against the exterior wall of the conduit 10—with the self-sealing axial aperture of the diaphragm, indicated by line 19, in axial alignment with the hole 11 in the conduit. In order to have the required self-sealing characteristics the diaphragm 18 is made of an elastic plastic material. Moreover since pressure measurements are often made on conduits at relatively high temperatures it is desirable to use a plastic material which will retain its elasticity at high temperatures. A suitable plastic material meeting these requirements is a fluoroelastomer known commercially as Viton and sold by E. I. du Pont de Nemours, Inc., Elastomers Chemicals Dept., Wilmington, Del. It will be understood however that the invention is not limited to the use of this particular plastic material but is comprehensive of other elastic plastic materials having similar properties. Referring again to the disc-shaped diaphragm 18, its axial hole 19 is adapted to be self-sealing both by reason of the elasticity of the plastic material used and the small diameter of the hole 19 and to this end the hole 19 is made by forcing a sharp pointed instrument, comparable to a domestic darning needle, through the plastic disc and thereafter withdrawing it.

The above described self-sealing apertured diaphragm assembly is used in combination with a pressurized vessel and the aforementioned pressure testing probe for measuring the pressure in the conduit 10.

Referring to FIG. 1 the vessel to be pressurized is indicated at 20 and in the form shown is a portable metal cylinder provided with a conventional pressure gauge 21, a standard tire valve 22 for pressurizing the cylinder with a conventional tire pump, and a nipple 23 having a standard needle valve 24. Connected by a hose clamp 25 to the outlet of the needle valve 24 is a flexible hose 26, as for example a standard tire pump hose, which is provided at its opposite end with a pressure testing probe 27 connected thereto by a hose clamp 28.

The pressure testing probe 27 is a hollow needle-like member the diameter of which is only slightly less than that of the pilot aperture 15 in the plug 14 so as to make a smooth sliding fit therein, and is of sufficient length to penetrate the apertured self-sealing diaphragm 18 and enter the drilled hole 11 in the side of the conduit 10. A suitable hollow needle-like member for this purpose is the conventional hollow needle used for inflating basketballs, footballs, and the like.

Figure 5:
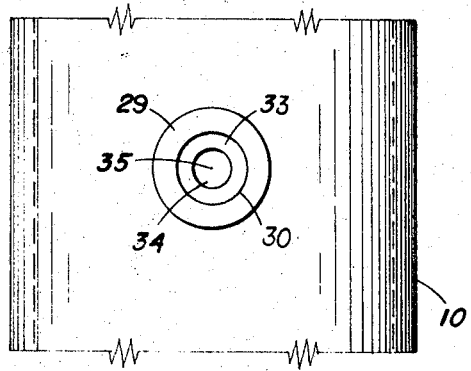
FIG. 5 is a fragmentary plan view of the chamber and modified self-sealing diaphragm assembly in the direction of arrows 5—5 of FIG. 4.
Figure 4:
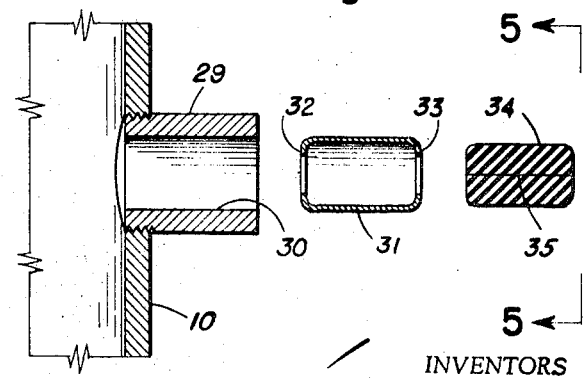
FIG. 4 is an enlarged, fragmentary, exploded cross-sectional view of the chamber in the direction of arrows 2—2 of FIG. 1 provided with a modified self-sealing diaphragm assembly.

FIGS. 4 and 5 show a modification of the self-sealing apertured diaphragm assembly in which the metal ring-member 12 is replaced by a pipe tap 29 which is screwed into a tapped hole in the wall of the conduit 10. The pipe tap 29 has a smooth bore 30 adapted to receive a cylindrical sheet metal casing 31 provided with annular flanges 32 and 33 at opposite ends respectively, the diameter of the casing 31 being only slightly less than that of the bore 30 of the pipe tap 29 so as to make a tight friction fit therein. The apertured self-sealing diaphragm of this modified assembly is indicated at 34 and again comprises an elastic plastic material but in this instance is a substantially cylindrical shape its dimensions corresponding substantially to the inner dimensions of the cylindrical sheet metal casing 31 whereby the plastic diaphragm 34 is adapted to make a snug fit therein and to be retained therein by the overlapping flanges 32 and 33 at opposite ends thereof. The elastic plastic diaphragm 34 is provided with a self-sealing central aperture, indicated by line 35, formed therein in the manner hereinabove described with respect to the disc-shaped diaphragm 18 of FIGS. 1–3.

The pressure measuring device of this invention is used in the following manner: given a conduit 10 through which a solids-burdened fluid is flowing at an unknown pressure, an apertured self-sealing diaphragm assembly of the type illustrated in FIGS. 1–3, or 4–5 as the case may be, is secured to the conduit at any point where it is desirous of determining the pressure in the conduit. The portable pressure vessel 20 is pressurized by closing the needle valve 24 of the pressure testing probe 27, attaching a hand-operated pump i.e. tire pump to the valve 22 and pumping up the pressure in the vessel 20 until the gauge 21 indicates a pressure which is well above the probable pressure in the conduit 10. Thereafter the pump is disengaged from valve 22 and the pressure testing probe 27 is inserted into the pilot aperture 15 of the plug 14 and forced through the self-sealing aperture 19 of the diaphragm 18 into the hole 11 in the wall of the conduit. The needle valve 24 is then opened thereby releasing the pressure in the pressurized vessel 20. The operator watches the hand of the pressure gauge 21 as the pressure drops and when the hand stops he immediately closes the needle valve 24. The reading of the gauge is that of the balanced pressure between the conduit 10 and the pressure vessel 20 which corresponds to the pressure in the conduit 10. Having determined the pressure at this point in the conduit the pressure testing probe is then withdrawn from the diaphragm whereupon its self-sealing aperture 19 closes and seals off the hole 11 in the conduit. Since the pressure in the pressure testing probe is never less than the pressure in the conduit the solids-burdened fluid therein is precluded from entering the pressure vessel and plugging or otherwise rendering the pressure gauge inoperable.

A portable pressure vessel 20 with attached pressure testing probe is relatively inexpensive and exceptionally convenient and easy to use. The invention also contemplates a pressure vessel and pressure testing probe in the form of a permanent onsite installation where circumstances are favorable. In this case the pressure vessel may be connected by suitable piping, valves, etc. to a pressure pipe-line for pressurizing the vessel in lieu of a hand pump.

The following examples will serve to illustrate the invention further:

The conduit 10 constituted ductwork leading from a steam grinding unit to a cyclone through which flowed steam carrying solid particles of $TiO_2$. The diameter of the conduit was 11 inches and the temperature in the conduit about 180° C. An apertured self-sealing diaphragm assembly of the type disclosed in FIGS. 1–3 was welded over a 1/8 inch hole in the wall of the conduit, the diameter of the ring member 12 being 2 inches and the diameter of the internally threaded aperture 13 being 1 inch. An apertured plastic valve disc of Viton approximately 1 inch in diameter and 1/8 inch thick was inserted in the central aperture of the ring member and secured with a fluid tight fit therein by a one inch plug 14 having an axial, countersunk pilot aperture 15 1/8 inch in diameter. diameter.

The pressure vessel comprised a tank 1.5 inches in diameter and 1 ft. long having a combination vacuum pressure gauge 21 mounted on its upper end via a pipe nipple provided with a 1/4 inch gate valve. A standard tubeless tire valve 22 was mounted in a 3/4 inch pipe nipple welded to the wall of the pressure vessel adjacent the upper end thereof. A 1/8 inch pipe nipple was welded to the pressure vessel adjacent the bottom thereof and supported a 1/4 inch Hagen needle valve 24. The end of a standard tire pump hose 26 was secured by means of a hose clamp to a 1/4 inch base adapter of the needle valve 24 while the opposite end of the pump hose carried a pressure testing probe 27 in the form of a basketball inflating needle. To measure the pressure in the conduit a tire pump was connected to the valve of the pressure vessel, the needle valve was closed and the pump operated to raise the pressure therein to 40 lbs. which was estimated at being at least 20 lbs. above the probable pressure in the conduit. The pump was then disconnected. The pressure testing probe was then thrust through the apertured self-sealing diaphragm 18 into the conduit whereupon the needle valve was opened slowly to reduce the pressure in the pressure vessel. The pressure dropped from 40 lbs. to 10 lbs. at which point the hand of the gauge 21 stopped indicating a balance in pressure between the pressure in the conduit and in the pressure vessel. The needle valve was then closed and the pressure testing probe withdrawn from the diaphragm.

There was no evidence of $TiO_2$ in the pressure vessel or gauge.

Although the invention has been described with reference to measuring the pressure in a conduit through which a solids-burdened fluid such as the $TiO_2$-burdened effluent from a steam micronizer is flowing it will be appreciated that the invention is equally applicable to any pressurized system i.e. a cyclone, micronizer or other chamber containing a solids burdened fluid under pressure; and may be used with either pressure or vacuum systems to provide rapid and accurate measurements under the adverse conditions hereinabove mentioned.

While this invention has been described and illustrated by the examples presented, it is not intended to be strictly limited thereto, and other variations and modifications may be employed within the scope of the following claims.

We claim:

1. Apparatus for measuring the pressure of a fluid in a conduit comprising in combination; a conduit having an aperture in the wall thereof, a diphragm comprising an elastic-plastic material having a self-sealing aperture therein; a ring-member fixedly secured to said conduit in axial alignment with the aperture therein, said diaphragm being mounted in said ring-member, fastening means constructed and arranged to engage tightly in said ring-member to hold said diaphragm in said ring-member with a fluid tight seal and with the aperture of said diaphragm in alignment with the aperture in the wall of said conduit, a portable pressure vessel having a pressure gauge, pump-means arranged to increase the pressure in said vessel above the estimated pressure of the fluid in said conduit, a tubular pressure testing probe connected to said pressure vessel and constructed and arranged to be removably passed through the self-sealing aperture of said diaphragm into the aperture of said conduit and a manually operated needle-valve arranged between said tubular pressure testing probe and said pressure vessel, said needle valve being arranged to close off said probe from said vessel when said vessel is pressurized and to be opened to release the pressure in said pressure vessel until it is balanced by the pressure of the fluid in said conduit whereby the pressure of the latter can be read from the pressure gauge of said pressure vessel.

2. Apparatus for measuring the pressure of a fluid in a pressurized conduit according to claim 1 wherein said diaphragm in a disc-shaped member, said ring-member is provided with internal threads and said fastening-means comprises a centrally apertured externally screw-threaded plug arranged to threadably engage the threads of said ring-member to engage and hold said disc-shaped diaphragm therein against the apertured wall of said conduit with a fluid tight seal.

3. Apparatus for measuring the pressure of a fluid in a pressurized conduit according to claim 1 wherein the fastening-means arranged to secure said self-sealing apertured diaphragm in said ring-member comprises a cylindrical metal-sheath arranged to encompass said diaphragm and to make a friction fit in said ring-member.

References Cited

UNITED STATES PATENTS

| | | | |
|---|---|---|---|
| 2,679,753 | 6/1954 | Flamm | 73—37X |
| 3,183,722 | 5/1965 | Unger et al. | 72—388 |
| 3,388,598 | 6/1968 | Hall | 73—406 |
| 3,438,397 | 4/1969 | Gilpin | 73—420X |

S. CLEMENT SWISHER, Primary Examiner

J. W. ROSKOS, Assistant Examiner